(12) United States Patent
Willis et al.

(10) Patent No.: US 9,727,050 B2
(45) Date of Patent: *Aug. 8, 2017

(54) PROCESSING MACHINERY PROTECTION AND FAULT PREDICTION DATA NATIVELY IN A DISTRIBUTED CONTROL SYSTEM

(71) Applicant: Computational Systems, Inc., Knoxville, TN (US)

(72) Inventors: John W. Willis, Oak Ridge, TN (US); Deane M. Horn, Knoxville, TN (US); Michael D. Medley, Knoxville, TN (US); Richard W. Kephart, Kittanning, PA (US); Kevin D. Steele, Knoxville, TN (US)

(73) Assignee: Computational Systems, Inc., Knoxville, TN (US)

( * ) Notice: Subject to any disclaimer, the term of this patent is extended or adjusted under 35 U.S.C. 154(b) by 98 days.

This patent is subject to a terminal disclaimer.

(21) Appl. No.: 14/808,418

(22) Filed: Jul. 24, 2015

(65) Prior Publication Data
US 2016/0026173 A1    Jan. 28, 2016

Related U.S. Application Data

(60) Provisional application No. 62/029,606, filed on Jul. 28, 2014.

(51) Int. Cl.
*G05B 19/4065* (2006.01)
*G01M 7/00* (2006.01)

(52) U.S. Cl.
CPC .......... *G05B 19/4065* (2013.01); *G01M 7/00* (2013.01); *G05B 2219/33273* (2013.01);
(Continued)

(58) Field of Classification Search
CPC ...... G05B 19/4065; G05B 2219/37434; G05B 2219/37252; G05B 2219/37435; G05B 2219/33273; G01M 7/00
See application file for complete search history.

(56) References Cited

U.S. PATENT DOCUMENTS 6,260,004 B1 * 7/2001 Hays .................. G05B 23/0235
702/130
6,839,660 B2 * 1/2005 Eryurek ............. G05B 23/0262
702/188

(Continued)

*Primary Examiner* — Ramesh Patel
(74) *Attorney, Agent, or Firm* — Luedeka Neely Group, P.C.

(57) ABSTRACT

A vibration data acquisition and analysis module is operable to be inserted directly into a distributed control system (DCS) I/O backplane, so that processed vibration parameters may be scanned directly by the DCS I/O controller. Because the process data and the vibration data are both being scanned by the same DCS I/O controller, there is no need to integrate numerical data, binary relay outputs, and analog overall vibration level outputs from a separate vibration monitoring system into the DCS. The system provides for: (1) directly acquiring vibration data by the DCS for machinery protection and predictive machinery health analysis; (2) direct integration of vibration information on DCS alarm screens; (3) acquisition and display of real time vibration data on operator screens; (4) using vibration data to detect abnormal situations associated with equipment failures; and (5) using vibration data directly in closed-loop control applications.

22 Claims, 3 Drawing Sheets

(52) U.S. Cl.
CPC .............. *G05B 2219/37252* (2013.01); *G05B 2219/37434* (2013.01); *G05B 2219/37435* (2013.01)

(56) References Cited

U.S. PATENT DOCUMENTS

| | | | | |
|---|---|---|---|---|
| 7,035,773 | B2* | 4/2006 | Keyes, IV | ......... G05B 19/4183 318/490 |
| 7,447,612 | B2* | 11/2008 | Keyes, IV | ......... G05B 19/4183 340/12.32 |
| 2002/0040278 | A1* | 4/2002 | Anuzis | .................... G01H 1/00 702/56 |
| 2006/0142875 | A1* | 6/2006 | Keyes | ................ G05B 19/4183 700/1 |
| 2009/0162186 | A1* | 6/2009 | Christinsen | .............. G01H 1/06 415/1 |
| 2010/0231348 | A1* | 9/2010 | Hugget | ................. G01H 1/003 340/3.42 |
| 2012/0319866 | A1* | 12/2012 | Svoen | ...................... H04Q 9/00 340/870.39 |
| 2014/0324367 | A1* | 10/2014 | Garvey, III | ........... G01D 18/00 702/56 |
| 2016/0025599 | A1* | 1/2016 | Willis | ............... G05B 19/4065 702/190 |
| 2016/0026172 | A1* | 1/2016 | Steele | ............... G05B 19/4065 700/175 |

\* cited by examiner

PROCESSING MACHINERY PROTECTION AND FAULT PREDICTION DATA NATIVELY IN A DISTRIBUTED CONTROL SYSTEM

RELATED APPLICATIONS

This application claims priority to provisional patent application Ser. No. 62/029,606, filed Jul. 28, 2014, titled "Methods and Apparatus for Integral Vibration Input and Output Card with Process Control System."

FIELD

This invention relates to the field of machine control and machine condition monitoring. More particularly, this invention relates to a system for integrating a machine vibration data acquisition and analysis module directly into a distributed control system architecture as a native data input device.

BACKGROUND

In prior machinery control and machinery vibration monitoring systems, the numerical data produced by a machinery vibration monitoring system had to be integrated with data produced by a machinery control system using intermediate communication protocols to bridge the systems together, such as under the OPC standard or Modbus or Profibus (process field bus). Using the traditional integration process, common communication protocols, protocol configuration, data networking, data synchronization, and the manual mapping of data were required. Testing and troubleshooting was required to verify the correct operation of the combined system.

In traditional machinery protection applications, binary relay outputs representing machine alarm states or trip states and analog 4-20 mA current loop outputs from a vibration monitor were used as hard-wired inputs to a distributed control system (DCS) for trip initiation and vibration values.

In traditional vibration monitoring systems, the trip levels and alarms were configured and displayed by the vibration monitoring systems separately from the control system configuration and display software. Vibration data was available to the control system only if the system integration methods described above were implemented to acquire the vibration data from the vibration monitoring system.

Therefore, what is needed is a system for making numerical data produced by a machinery vibration monitoring system available to a machinery control system without having to use intermediate communication protocols to bridge the systems together.

SUMMARY

Embodiments of the present invention provide a vibration data acquisition and analysis module that is operable to be inserted directly into a DCS I/O backplane, so that processed vibration parameters may be scanned directly by the DCS I/O controller. Because the process data and the vibration data are both being scanned by the same DCS I/O controller, there is no need to integrate numerical data, binary relay outputs, and analog overall vibration level outputs from a separate vibration monitoring system into the process control system. Further advantages of embodiments of the invention include: (1) direct acquisition of vibration data by the control system for purposes of machinery protection and predictive machinery health analysis; (2) direct integration of vibration information on DCS alarm screens; (3) acquisition and display of real time vibration data on operator screens; (4) the ability to utilize vibration data for detection of abnormal situations associated with equipment failures; and (5) the ability to utilize vibration data directly in closed-loop control applications.

Machinery Protection/Prediction Native in DCS

Some embodiments of the invention provide a vibration data acquisition system that collects and processes machinery protection data and machinery prediction data in a software format that is native to the DCS. As the term is used herein, software is "native" to a platform if it is designed to run on that platform, where the platform may be an operating system or a device, such as a DCS controller. The system includes vibration modules that calculate scalar overall vibration parameters from vibration waveforms in a DCS machinery health monitor module. These scalar overall values are preferably calculated using parallel digital signal processing in a field card Field Programmable Gate Array (FPGA). These processed scalar vibration values are transmitted to the DCS I/O controller via the conventional DCS serial I/O bus.

The scalar vibration values are scanned and processed by logic routines (referred to herein as "control sheets") that run at a deterministic rate in the DCS controller. The output of the control sheet logic is preferably transmitted to DCS output modules to perform machine shutdown or other control functions. In various embodiments, control sheets may be optimized for maximum protection (more stringent machine protection) or maximum availability (relaxed protection to minimize nuisance or false trip events).

Preferred embodiments of the invention provide the ability to transfer time waveform data from the vibration data acquisition system, such as via Ethernet, and view the waveform data on a machine health management analysis computer. Some embodiments also provide for moving blocks of time waveform data on the DCS I/O bus. In these embodiments, the time waveform block data may be transferred to the DCS controller via the DCS serial I/O bus backplane using DCS Remote Desktop Protocol (RDP).

Separation of Protection and Prediction

Preferred embodiments of the invention also provide for separation of machinery protection functions from machinery prediction functions. In particular, prediction data acquisition and processing does not interfere with protection data acquisition and processing because the two data streams are processed through separate, independent data paths in the signal processing FPGA. Also, preferred embodiments implement separate physical ports for protection data and prediction data. Prediction data is accessed by Machine Health Management (MHM) software via a dedicated Ethernet port that can be disabled by the DCS configuration software. Protection data is transmitted to the DCS controller via the DCS I/O backplane or is made available via a separate dedicated Ethernet port. Further, prediction components cannot "write" to protection components, and separate configuration and data storage is provided.

In preferred embodiments, all protection hardware configuration functions are handled by DCS software only, although MHM prediction software may access the protection configuration data to determine sensor and measurement configuration.

Further, MHM prediction software can control only the prediction time waveform. Although the prediction software can read protection overall values, the prediction software cannot affect the configuration of the overall level measurements used for protection functions. Also in preferred embodiments, the prediction tasks run at lower priority in the pre-emptive multitasking real-time operating system (RTOS).

Preferably, there are separate software hosts that consume the protection and prediction data. A DCS software host processes the protection data, while an MHM software host processes the prediction data.

One embodiment of the invention is directed to a machinery health monitoring (MHM) module that processes machine vibration data based on vibration signals and provides the machine vibration data to a distributed control system (DCS). The machinery health monitoring module includes signal conditioning circuitry, processing circuitry, and logic generator circuitry. The signal conditioning circuitry has an interface for receiving analog vibration signals from sensors attached to a machine, amplification and filter circuitry for conditioning the analog vibration signals, and analog-to-digital conversion circuitry for converting the analog vibration signals into digital vibration signals. The processing circuitry includes multiple parallel digital signal processing channels. Each channel processes a corresponding one of the digital vibration signals to generate multiple scalar vibration values per channel and at least one vibration time waveform per channel. The logic generator circuitry receives the multiple scalar vibration values and the vibration time waveform, and formats them according to an input/output data protocol that is native to the DCS.

In some embodiments, the logic generator circuitry includes a backplane interface that is configured to electrically and mechanically connect to and disconnect from an input/output bus of the DCS. In these embodiments, the multiple scalar vibration values are communicated through the backplane interface and the input/output bus of the DCS using the input/output data protocol that is native to the DCS.

In some embodiments, the logic generator circuitry includes a first network communication interface that is independent of the backplane interface. The first network communication interface communicates the vibration time waveform via a communication network to a machine health management data analysis computer for machine health prediction processing.

In some embodiments, the logic generator circuitry includes a second network communication interface that is independent of the backplane interface. The second network communication interface is operable to communicate the vibration time waveform via a communication network to a DCS operator computer for machine protection processing.

In preferred embodiments, the first and second network communication interfaces are Ethernet interface ports.

In some embodiments, the logic generator circuitry communicates the vibration time waveform in data blocks through the backplane interface and the input/output bus of the DCS using a block data transfer protocol.

In some embodiments, the multiple parallel digital processing channels of the processing circuitry include a first channel for processing a vibration time waveform for use in machine health prediction processing, and a second channel for processing a vibration time waveform for use in machine protection processing. The processing performed in the second channel is preferably independent from processing performed in the first channel.

Another embodiment of the invention is directed to a DCS that includes an input/output bus, one or more MHM modules, one or more DCS input modules, a DCS controller, and one or more distributed control system output modules. The input/output bus transfers data according to a data communication protocol that is native to the DCS. Each MHM module includes signal conditioning circuitry, processing circuitry, and logic generator circuitry as described above. The DCS input modules receive sensor signals from process sensors attached to a machine, generate scalar process values based on the sensor signals, and provide the scalar process values to the input/output bus. The process sensors include sensors other than vibration sensors. The DCS controller includes interface circuitry and logic circuitry. The interface circuitry scans the input/output bus at a predetermined rate to receive the scalar vibration values and the scalar process values. The logic circuitry executes control logic routines that generate control signals based on logical processing of one or more of the scalar vibration values, one or more of the scalar process values, or a combination of scalar vibration values and scalar process values. The DCS output modules receive the control signals from the input/output bus and generate machine operation output signals based on the control signals.

In some embodiments, the logic circuitry of the DCS controller executes the control logic routines and generates the control signals at the same predetermined rate at which the interface circuitry scans the scalar vibration values and the scalar process values from the input/output bus.

In some embodiments, the DCS input modules generate temperature scalar values, pressure scalar values, flow rate scalar values, and speed scalar values.

In some embodiments, each MHM module generates scalar vibration values that include an RMS value, a peak value, a peak-to-peak value, a DC value, an absolute +/−peak value, and a PeakVue value.

In some embodiments, the logic circuitry of the DCS controller selectively executes logic control routines (also referred to herein as control sheets) that are optimized for different purposes. Some logic control routines are optimized for maximum machine protection using first trip threshold levels. Other logic control routines that are optimized for maximum machine availability using second trip threshold levels that are higher than the first trip threshold levels.

In another aspect, an embodiment of the invention provides a method for processing data in a DCS. The data is based on sensor signals generated by sensors attached to one or more machines that are under control of the DCS. The method includes:

(a) receiving analog vibration signals from sensors attached to the one or more machines;

(b) converting the analog vibration signals into digital vibration signals;

(c) simultaneously processing the digital vibration signals in multiple parallel digital signal processing channels, where the processing includes:

(c1) processing the digital vibration signals in one or more of the parallel digital signal processing channels that are dedicated to machine health prediction processing only; and (c2) processing digital vibration signals in one or more of the parallel digital signal processing channels that are dedicated to machine health protection processing only, wherein the digital signal processing channels that are dedicated to machine health prediction processing are separate from and independent of the digital signal processing channels that are dedicated to machine health protection processing;

(d) generating machine operation output signals based on the machine health protection processing;

(e) generating machine performance signals based on the machine health prediction processing;

(f) using the machine operation output signals in the DCS to shut down one or more of the machines to avoid damage; and (g) using the machine performance signals to observe trends in machine performance or to predict how much longer one or more of the machines can operate before being taken offline for maintenance or replacement.

In some embodiments, the processing steps (c1) and (c2) are performed in separate and independent parallel channels of a field programmable gate array (FPGA).

In some embodiments, the processing step (c1) cannot affect the processing step (c2).

In some embodiments, data associated with the processing step (c1) are stored in first memory locations, and data associated with the processing step (c2) are stored in second memory locations, and the second memory locations can be read by the processing step (c1) but cannot be written to by the processing step (c1).

In some embodiments, the processing step (c1) has a lower priority than the processing step (c2) in a real-time operating system that controls task priority in the DCS.

In some embodiments, step (f) includes providing the machine operation output signals to the distributed control system via an input/output bus, and step (g) includes providing the machine performance signals to a machine health management data analysis computer via a network communication interface that is independent of the input/output bus. In some embodiments, the method includes generating control signals in the DCS to selectively disable the network communication interface.

BRIEF DESCRIPTION OF THE DRAWINGS

Other embodiments of the invention will become apparent by reference to the detailed description in conjunction with the figures, wherein elements are not to scale so as to more clearly show the details, wherein like reference numbers indicate like elements throughout the several views, and wherein.

DETAILED DESCRIPTION

Embodiments of the present invention provide a vibration data acquisition and analysis module that interfaces directly to a distributed control system I/O backplane to allow direct acquisition of vibration data by the DCS for purposes of machinery protection and predictive machinery health analysis. As the term is used herein, a "distributed control system (DCS)" is a type of automated control system used in a process or plant in which control elements are distributed throughout a machine or multiple machines to provide operational instructions to different parts of the machine(s). As the term is used herein, "protection" refers to using data collected from one or more sensors (vibration, temperature, pressure, etc.) to shut down a machine in situations in which severe and costly damage may occur if the machine is allowed to continue running "Prediction" on the other hand refers to using data collected from one or more vibration sensors, perhaps in combination with data from other types of sensors, to observe trends in machine performance and predict how much longer a machine can operate before it should be taken offline for maintenance or replacement.

Figure 1:
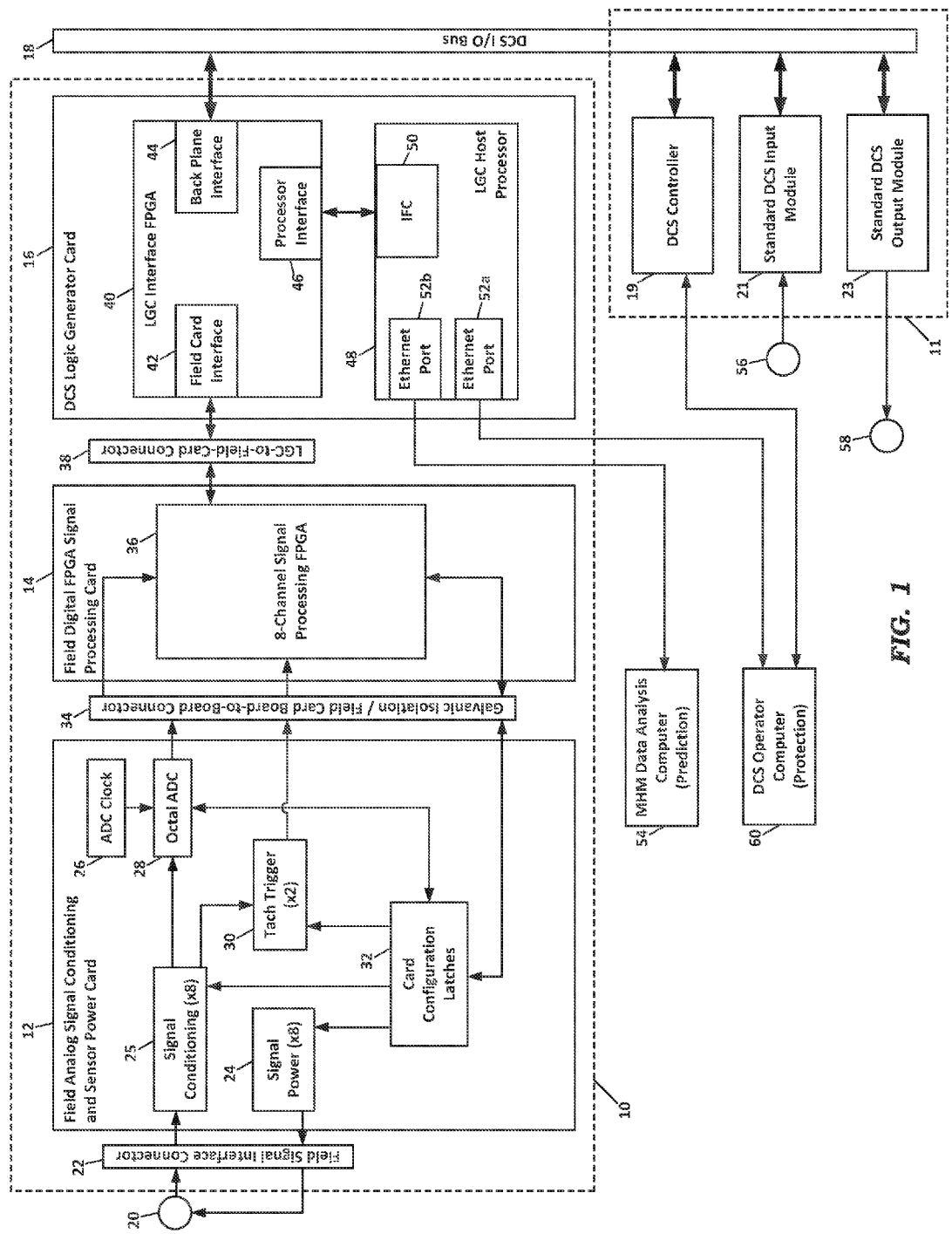
FIG. 1 depicts a machinery health monitoring (MHM) module according to an embodiment of the invention.

FIG. 1 depicts a machinery health monitoring module (MHM) 10 that directly interfaces with a DCS 11. In the preferred embodiment, the module 10 includes a field analog signal conditioning and sensor power card 12 that receives and conditions sensor signals, a field digital FPGA signal processing card 14 that processes the sensor signals, and a DCS logic generator card (LGC) 16 that provides an interface to a DCS I/O bus 18. The field card 12 can preferably accept input from up to eight measurement sensors 20 through a field signal interface connector 22. In a preferred embodiment, two of the sensor input channels may be configured as tachometer channels.

Preferably, galvanic electrical isolation is provided between the analog field card 12 and the digital field card 14. This electrical isolation prevents unintentional current flow, such as due to ground loops, between the mounting locations of the sensors 20 and the DCS 11.

Sensor power 24 and signal conditioning circuits 26 can support a wide range of sensors 20, including piezo accelerometers, piezo ICP velocity, piezo dynamic pressure, electro-dynamic velocity, eddy current displacement, AC vibration, and DC displacement. Tachometer sensors that are supported include eddy current displacement sensors, passive electro-magnetic sensors, Hall Effect tachometer sensors, N pulse/rev shaft encoders, and TTL pulse sensors. Many additional sensor types are supported over the frequency range of DC to 20 KHz as long as they fall within the following exemplary voltage input ranges: 0 to +24V, −24V to +24V, −12V to +12V, and 0 to −24V. In the preferred embodiment, up to eight sensor power circuits 24 can be individually programmed for a constant current of between 0 and 20 mA, which may also be used as lift current for an electro-dynamic (passive) velocity sensor. Constant voltage sources (+24VDC or −24VDC) may be selected as well as constant current. The input voltage ranges listed above are also individually programmable on each sensor channel. This permits any mix of sensor power and input range configuration between the channels, thereby enabling a mix of supported sensors.

With timing provided by a clock 26, an 8-channel analog-to-digital converter (ADC) 28 converts the eight analog signals into a single serial data stream comprising eight simultaneously sampled interleaved channels of data. In some preferred embodiments, two tachometer triggering circuits 30 convert the two analog tachometer signals into tachometer pulses.

On the field card 14 is an 8-channel field programmable gate array (FPGA) 36 for processing the vibration data. The FPGA 36 receives the 8-channel digital waveform data and 2-channel tachometer data and processes the raw data in parallel to generate scalar overall vibration parameters and waveforms. The processed waveforms may include low-pass filtered, PeakVue™, order tracking, high-pass filtered (DC blocked), and selectable single-integrated (velocity), double-integrated (displacement), or non-integrated (acceleration) waveforms. Prediction data channels also preferably include an up-sampling data block to provide higher resolution data for Time Synchronous Averaging (TSA) or order tracking applications.

The vibration card configuration circuit 32 of the analog field card 12 preferably includes of a set of serial-to-parallel latch registers that accept a serial data stream of configuration data from the application firmware of the LGC 16. This data is loaded into a parallel-to-serial shift register in the interface of the FPGA 36. The FPGA 36 then handles shifting the serial data to the control latches using a synchronous SPI format.

During operation of the preferred embodiment, the MHM module 10 appears to the DCS controller 19 as a multichannel analog input card having scalar outputs similar to those of a standard DCS input module 21, such as may be outputting measured temperature, pressure, or valve position values. As discussed in more detail hereinafter, vibration signals are converted to scalar values by the module 10 and presented to the DCS controller 19 via the backplane of the DCS. One example of a DCS controller 19 is the Ovation™ controller manufactured by Emerson Process Management (a division of Emerson Electric Co.). In the typical DCS architecture, only sixteen scalar values are presented as high speed scan values to the DCS controller 19. In a high speed scan, the DCS controller 19 can read these sixteen scalar values at up to a 10 mS rate.

Time waveform block data (and some scalar values) may be transferred to the DCS controller 19 via the DCS I/O bus 18 using a block data transfer method, such as Remote Desktop Protocol (RDP), at a rate that is lower than the scan rate of the sixteen scalar values.

As the scalar values generated by the machinery health monitoring module 10 are read by the DCS controller 19, they are processed by software running in the DCS controller 19 in the same manner as any other DCS data. One primary function of the DCS controller 19 is to compare the scalar values with alarm limits. If the limits are exceeded, alarms are generated. Logic within the DCS controller 19 may also determine whether any actions should be taken based on alarm conditions, such as closing a relay. Operations including alarm relay logic, voting, and time delays are also performed in software by the DCS controller 19. Preferably, DCS control outputs, such as relay outputs and 4-20 mA proportional outputs, are driven by standard output modules 23 of the DCS. Bulk prediction data is formatted in the LGC host processor 48 and is transmitted via an Ethernet port 52a to a machine health management (MHM) analysis computer 54 for detailed analysis and display. Bulk protection data is also formatted in the LGC host processor 48, but is transmitted via a separate Ethernet port 52b to the DCS operator computer 60.

In preferred embodiments, a DCS operator computer 60 includes an interface for displaying vibration parameters and other machine operational data (pressures, temperatures, speeds, alarm conditions, etc.) that are output from the DCS controller 19.

Figure 2:
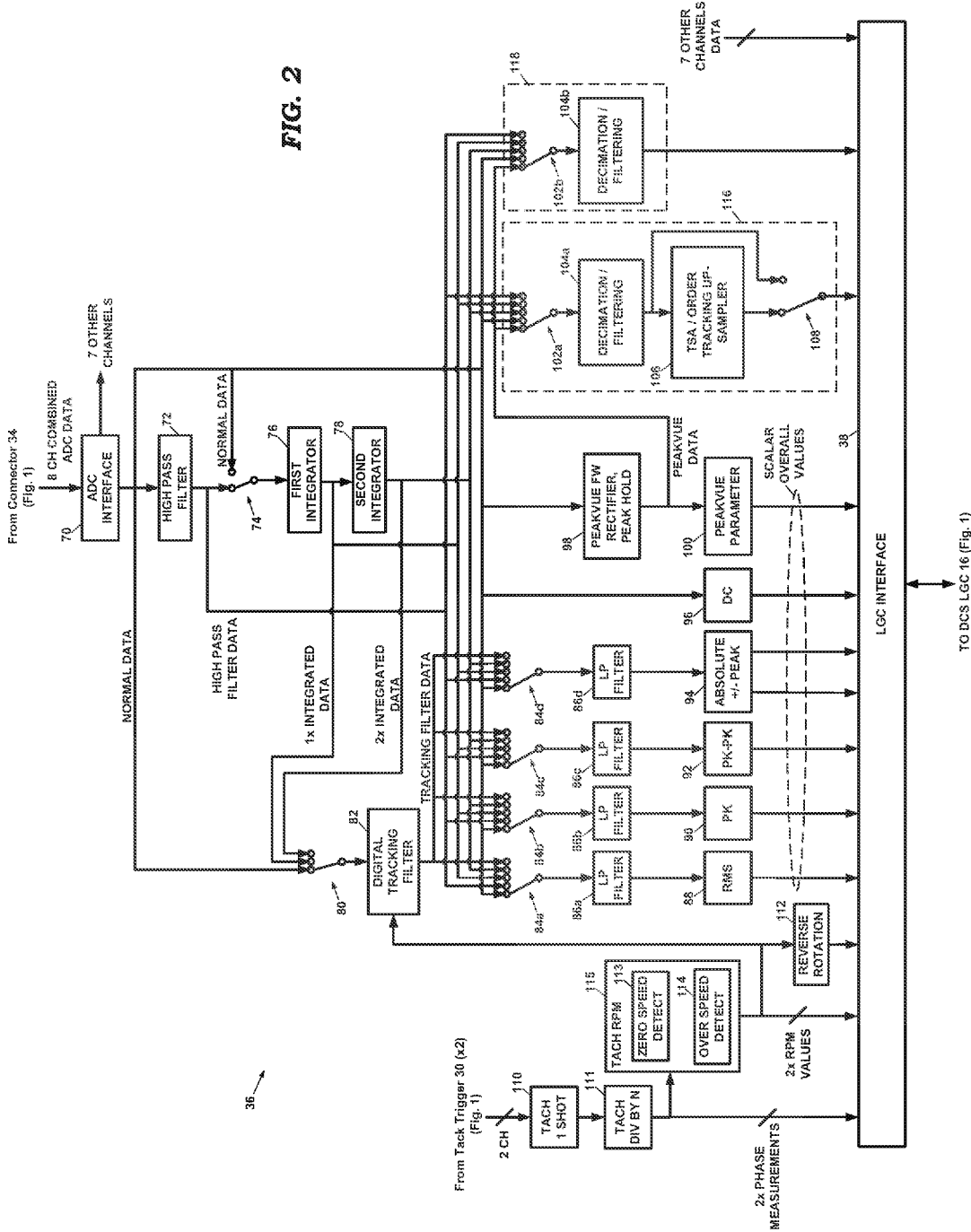
FIG. 2 depicts field digital FPGA signal processing circuitry according to an embodiment of the invention.

A functional block diagram of a single channel of the field digital FPGA 36 is depicted in FIG. 2. A preferred embodiment includes seven additional channels having the same layout as the one channel depicted in FIG. 2. As described in more detail hereinafter, the channel digital waveform data may be routed through a variety of digital filters and integration stages before being converted to vibration overall values or packaged as "bulk" time waveforms for further analysis by software running on the LGC card 16 or for transmission to DCS software or MHM software.

As shown in FIG. 2, an ADC interface 70 receives the eight channels of continuous, simultaneously sampled data from the ADC 28 of the field analog card 12 through the connector 34 (shown in FIG. 1). The data is preferably in the form of a multiplexed synchronous serial data stream in Serial Peripheral Interface (SPI) format. The ADC interface 70 de-multiplexes the data stream into eight separate channel data streams.

Although all eight channels could be used for vibration signal processing, in a preferred embodiment two of the eight channels may be used for tachometer measurement processing. Each tachometer measurement channel preferably includes:

- a one-shot 110, which is a programmable trigger "blanking" function that provides noise rejection for tachometer pulse trains having excessive jitter or noise;
- a divide-by-N 111, which is a programmable pulse divider that divides pulse rates of tachometer signals produced by gears or code wheels;
- a reverse rotation detector 112 that determines the direction of shaft rotation by comparing the phase of two tachometer pulse signals;
- an RPM indicator 115 that calculates the RPM of the tachometer pulse stream as a scalar overall value.
- a zero-speed detector 113 that provides a "zero speed" indication when the tachometer has been inactive for a programmable interval, such as 0.1 s, 1 s, 10 s, or 100 s; and
- an over-speed detector 114 that provides an "over speed" indication when the tachometer exceeds a fixed 2 KHz or 62 KHz threshold. In alternative embodiments, this threshold may be programmable.

With continued reference to FIG. 2, each of the eight independent parallel channels of signal processing in the FPGA 36 preferably includes the following components:

- a high pass filter 72 for DC blocking, which is preferably be set to 0.01 Hz, 0.1 Hz, 1 Hz, or 10 Hz, and which may be selected or bypassed for the integrators described below based on the position of a switch 74;
- two stages of digital waveform integration, including a first integrator 76 and a second integrator 78, which provide for data unit conversion from acceleration to velocity, acceleration to displacement, or velocity to displacement;
- a digital tracking band pass filter 82 having a band pass center frequency that is set by the tachometer frequency or multiples of the tachometer frequency, and that receives as input either the "normal" data stream (no integration), the single integration data stream, or the double integration data stream based on the position of a switch 80, as described in more detail below; and
- scalar overall measurement calculation blocks 88-100 that determine several different waveform scalar overall values as described below.

In the preferred embodiment, the purpose of the digital tracking band pass filter 82 is to provide a narrow (high Q) band pass response with a center frequency determined by the RPM of a selected tachometer input. The center frequency may also be a selected integer multiple of the tachometer RPM. When a waveform passes through this filter, only vibration components corresponding to multiples of the turning speed of the monitored machine will remain. When the RMS, peak, or peak-to-peak scalar value of the resultant waveform is calculated by the corresponding FPGA calculation block (88, 90 or 92), the result is same as a value that would be returned by an "nX peak" calculation performed in the application firmware of the LGC 16. Because this scalar calculation is performed as a continuous process in the FPGA 36 rather than as a calculation done in firmware, it is better suited to be a "shutdown parameter" as compared to a corresponding value produced at a lower rate in firmware. One application of this measurement is in monitoring aero-derivative turbines, which generally require a tracking filter function for monitoring.

For several of the scalar overall values, the individual data type from which the values are calculated may be selected from the normal data stream, the single-integrated data stream, the double-integrated data stream, the high-pass filtered (DC blocked) data stream, or the tracking filter data stream based on the positions of the switches 84a-84d. Also, several of the scalar overall channels have an individually-programmable low-pass filter 88a-88d. In the preferred embodiment, these scalar overall values are generated independently of and in parallel to the time waveforms that are used for prediction or protection. The scalar overall measurement calculation blocks preferably include:

an RMS block 88 that determine the RMS value of the time waveform, where the RMS integration time may preferably be set to 0.01 s, 0.1 s, 1 s, or 10 s;

a peak block 90 that determines the greater of the positive or negative waveform peak value relative to the average value of the waveform, which is preferably measured over a period determined by either the tachometer period or a programmable time delay;

a peak-peak block 92 that determines the waveform peak-to-peak value over a period determined by either the tachometer period or a programmable time delay;

an absolute +/− peak block 94 that determines the value of the most positive signal waveform excursion and the value of the most negative signal waveform excursion relative to the zero point of the measurement range, which is preferably measured over a period determined by either the tachometer period or a programmable time delay;

a DC block 96 that determines the DC value of the time waveform, which has a measurement range preferably set to 0.01 Hz, 0.1 Hz, 1 Hz, or 10 Hz; and a PeakVue™ block 100 that determines a scalar value representing the peak value of the filtered and full-wave-rectified PeakVue™ waveform as described in U.S. Pat. No. 5,895,857 to Robinson et al. (incorporated herein by reference), which is preferably measured over a period determined by either the tachometer period or a programmable time delay. Full wave rectification and peak hold functions are implemented in the functional block 98. The PeakVue™ waveform from the block 98 is also made available as a selectable input to the prediction time waveform and protection time waveform processing described herein.

The prediction time waveform processing section 116 of the FPGA 36 provides a continuous, filtered time waveform for use by any prediction monitoring functions. An independent lowpass filter/decimator 104a is provided so that the prediction time waveform may be a different bandwidth than the protection time waveform. A waveform up-sampling block 106 provides data rate multiplication for analysis types such as Time Synchronous Averaging (TSA) and Order Tracking Input to the prediction time waveform processing section 116 may be selected from the normal data stream, the single-integrated data stream, the double-integrated data stream, the high-pass filtered (DC blocked) data stream, or the PeakVue™ data stream based on the positions of the switch 102a.

The protection time waveform section 118 of the FPGA 36 provides a continuous, filtered time waveform for use by protection monitoring functions. An independent low pass filter/decimator 104b is provided so that the protection time waveform may be a different bandwidth than the prediction time waveform. Input to the protection time waveform processing section 118 may be selected from the normal data stream, the single-integrated data stream, the double-integrated data stream, the high-pass filtered (DC blocked) data stream, or the PeakVue™ data stream based on the positions of the switch 102b.

Preferred embodiments provide for transient data collection, wherein continuous, parallel time waveforms from each signal processing channel may be collected for transmission to external data storage. Transient waveforms are preferably fixed in bandwidth and are collected from the protection time waveform data stream.

As shown in FIG. 1, the scalar overall values, as well as the digitally filtered time waveforms, pass through the LGC interface 38 to the LGC logic board 16 for further processing and transportation to the DCS controller 19 via the DCS I/O backplane 18 or to external software applications running on the MHM data analysis computer 54 via the Ethernet port 52.

Figure 3:
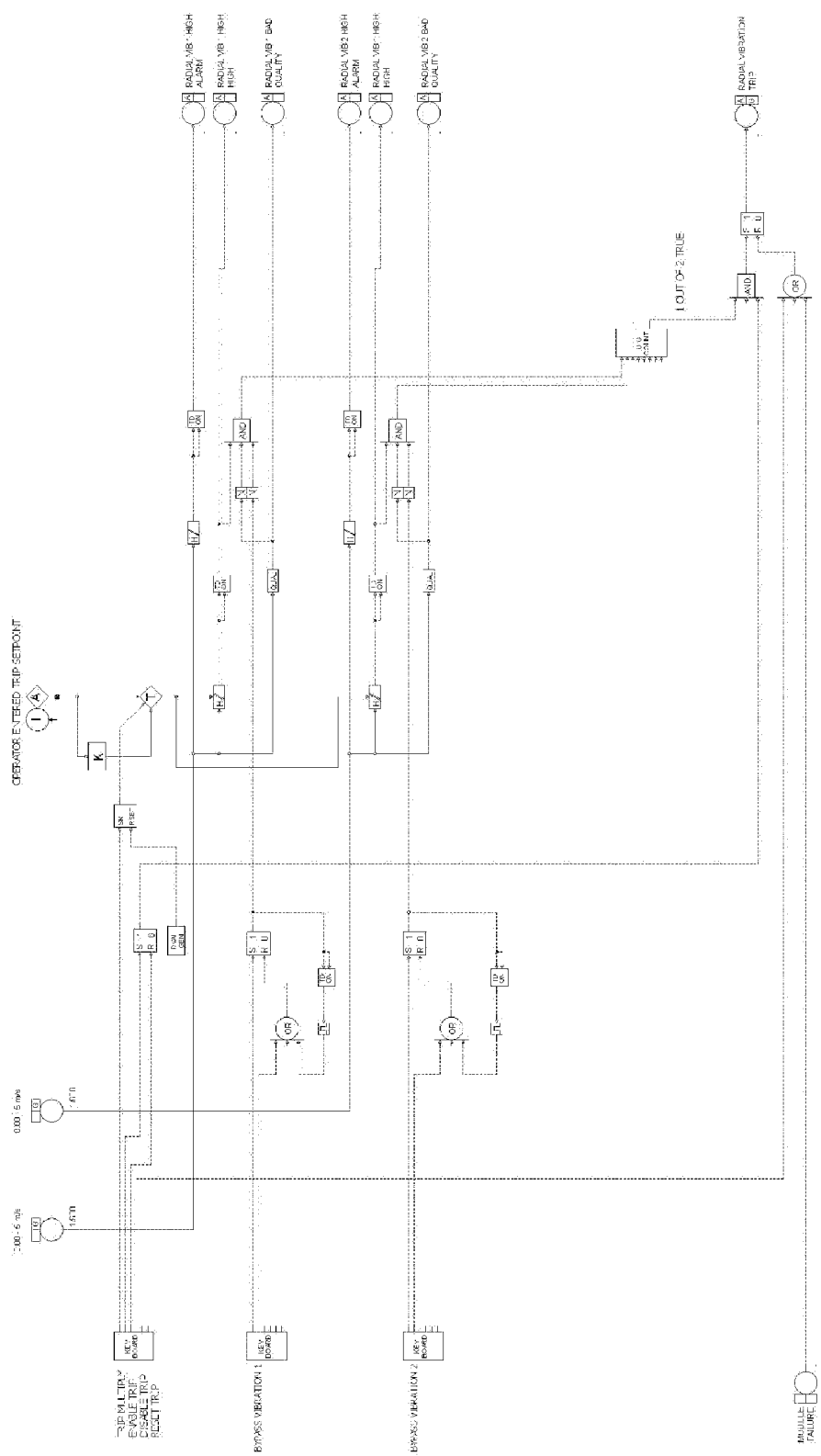
FIG. 3 depicts an example of control logic executed by a DCS controller according to an embodiment of the invention.

FIG. 3 depicts an example of a control logic routine (also referred to herein as a control sheet) that is performed by the DCS controller 19. In preferred embodiments, a control sheet is scheduled to execute at a predetermined rate, such as 1 sec, 0.1 sec, or 0.01 sec, by the DCS software running in the controller 19. As the control sheet that controls the vibration process is executed, scalar overall vibration values are scanned from the DCS I/O bus 18 and output values are generated at the execution rate of the control sheet.

Logic functions performed by the control sheets preferably include:

Voting logic, such as logic to determine that an alert condition exists if 2 out of 2 scalar values are over threshold, or 2 out of 3 are over threshold.

Combining vibration data with other DCS process parameter data (such as pressure and temperature).

Trip multiply, which is a temporary condition determined by current machine state or by manual input that increases an alarm level. Trip multiply is typically used during the startup of a rotational machine, such as a turbine. As the turbine speeds up, it normally passes through at least one mechanical resonance frequency. Since higher than normal vibration conditions are measured during this resonance, "trip multiply" is used to temporarily raise some or all of the alarm levels to avoid a false alarm trip. The trip multiply input may be set manually with operator input, or automatically based on RPM or some other "machine state" input.

Trip bypass, which is typically a manual input to suppress operation of the output logic to disable trip functions, such as during machine startup. Trip bypass is a function that suppresses either all generated vibration alarms, or any outputs that would be used as a trip control, or both. The trip bypass input may be set manually with operator input, or automatically based on some "machine state" input.

Time delay, which is a delay that is normally programmed to ensure that trip conditions have persisted for a specified time before allowing a machine trip to occur. Trip time delays are normally set to between 1 and 3 seconds as recommended by API670. The purpose of this delay is to reject false alarms caused by mechanical or electrical spikes or glitches.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A machinery health monitoring module that processes machine vibration data based on vibration signals and provides the machine vibration data to a distributed control system, the machinery health monitoring module comprising:
   signal conditioning circuitry having an interface for receiving a plurality of analog vibration signals from a plurality of sensors attached to a machine, amplification and filter circuitry for conditioning the plurality of analog vibration signals, and analog-to-digital conversion circuitry for converting the plurality of analog vibration signals into a plurality of digital vibration signals;
   processing circuitry in electrical communication with the signal conditioning circuitry, the processing circuitry comprising a plurality of parallel digital signal processing channels, each channel for processing a corresponding one of the plurality of digital vibration signals to generate multiple scalar vibration values per channel and at least one vibration time waveform per channel; and
   logic generator circuitry in electrical communication with the processing circuitry, the logic generator circuitry operable to receive the multiple scalar vibration values and the at least one vibration time waveform, and operable to format at least the multiple scalar vibration values according to an input/output data protocol that is native to the distributed control system.

2. The machinery health monitoring module of claim 1 wherein the logic generator circuitry includes a backplane interface configured to electrically and mechanically connect to and disconnect from an input/output bus of the distributed control system, and wherein the multiple scalar vibration values are communicated through the backplane interface and the input/output bus of the distributed control system using the input/output data protocol that is native to the distributed control system.

3. The machinery health monitoring module of claim 2 wherein the logic generator circuitry includes at least one network communication interface operable to communicate the at least one vibration time waveform via a communication network to a machine health management data analysis computer for machine health prediction processing, wherein the at least one network communication interface is independent of the backplane interface.

4. The machinery health monitoring module of claim 3 wherein the at least one network communication interface comprises an Ethernet interface port.

5. The machinery health monitoring module of claim 2 wherein the logic generator circuitry includes at least one network communication interface operable to communicate the at least one vibration time waveform via a communication network to a digital control system operator computer for machine protection processing, wherein the at least one network communication interface is independent of the backplane interface.

6. The machinery health monitoring module of claim 5 wherein the at least one network communication interface comprises an Ethernet interface port.

7. The machinery health monitoring module of claim 2 wherein the logic generator circuitry includes:
   a first network communication interface operable to communicate the at least one vibration time waveform via a first communication network to a machine health management data analysis computer for machine health prediction processing; and
   a second network communication interface operable to communicate the at least one vibration time waveform via a second communication network to a digital control system operator computer for machine protection processing,
   wherein the first and second network communication interfaces are independent of the backplane interface.

8. The machinery health monitoring module of claim 7 wherein the first and second network communication interfaces comprise Ethernet interface ports.

9. The machinery health monitoring module of claim 2 wherein the logic generator circuitry is operable to communicate the at least one vibration time waveform in data blocks through the backplane interface and the input/output bus of the distributed control system using a block data transfer protocol.

10. The machinery health monitoring module of claim 1 wherein the plurality of parallel digital processing channels of the processing circuitry include:
    a first channel for processing a vibration time waveform for use in machine health prediction processing; and
    a second channel for processing a vibration time waveform for use in machine protection processing, wherein processing performed in the second channel is independent from processing performed in the first channel.

11. A distributed control system comprising:
    an input/output bus through which data are transferred according to a data communication protocol that is native to the distributed control system;
    one or more machinery health monitoring modules in electrical communication with the input/output bus, each of the one or more machinery health monitoring modules comprising:
      signal conditioning circuitry having an interface for receiving a plurality of analog vibration signals from a plurality of sensors attached to a machine, amplification and filter circuitry for conditioning the plurality of analog vibration signals, and analog-to-digital conversion circuitry for converting the plurality of analog vibration signals into a plurality of digital vibration signals;
      processing circuitry in electrical communication with the signal conditioning circuitry, the processing circuitry comprising a plurality of parallel digital processing channels, each channel for processing a corresponding one of the plurality of digital vibration signals to generate multiple scalar vibration values per channel and at least one vibration time waveform per channel; and
      logic generator circuitry in electrical communication with the processing circuitry, the logic generator circuitry operable to receive the multiple scalar vibration values and the at least one vibration time waveform, and operable to format at least the multiple scalar vibration values according to an input/output communication protocol that is native to the distributed control system, the logic generator circuitry including a backplane interface configured to electrically and mechanically connect to and disconnect from the input/output bus, wherein the multiple scalar vibration values are communicated through the backplane interface and the input/output bus according to the input/output communication protocol that is native to the distributed control system;

one or more distributed control system input modules in electrical communication with the input/output bus, each of the one or more distributed control system input modules operable to receive sensor signals from process sensors attached to a machine, generate scalar process values based on the sensor signals from the process sensors, and provide the scalar process values to the input/output bus, wherein the process sensors include sensors other than vibration sensors;

a distributed control system controller comprising:
  interface circuitry that scans the input/output bus at a predetermined rate to receive the scalar vibration values and the scalar process values therefrom; and
  logic circuitry for executing control logic routines that generate control signals based on logical processing of one or more of the scalar vibration values, one or more of the scalar process values, or a combination of one or more of the scalar vibration values and one or more of the scalar process values; and one or more distributed control system output modules in electrical communication with the input/output bus, each of the one or more distributed control system output modules operable to receive the control signals from the input/output bus and generate machine operation output signals based on the control signals.

12. The distributed control system of claim 11 wherein the logic circuitry of the distributed control system controller executes the control logic routines and generates the control signals at the same predetermined rate at which the interface circuitry scans the scalar vibration values and the scalar process values from the input/output bus.

13. The distributed control system of claim 11 wherein the one or more distributed control system input modules generate the scalar process values including one or more of temperature scalar values, pressure scalar values, flow rate scalar values, and speed scalar values.

14. The distributed control system of claim 11 wherein the one or more machinery health monitoring modules generate the scalar vibration values including one or more of an RMS value, a peak value, a peak-to-peak value, a DC value, an absolute +/−peak value, and a PeakVue value.

15. The distributed control system of claim 11 wherein the logic circuitry selectively executes:
  first control logic routines that are optimized for maximum machine protection using first trip threshold levels; or
  second logic control routines that are optimized for maximum machine availability using second trip threshold levels that are higher than the first trip threshold levels.

16. A method for processing data in a distributed control system, wherein the data is based on sensor signals generated by sensors attached to one or more machines that are under control of the distributed control system, the method comprising:
  (a) receiving a plurality of analog vibration signals from a plurality of sensors attached to the one or more machines;
  (b) converting the plurality of analog vibration signals into a plurality of digital vibration signals;
  (c) simultaneously processing the plurality of digital vibration signals in a plurality of parallel digital signal processing channels, the processing comprising:
    (c1) processing one or more of the plurality of digital vibration signals in one or more of the plurality of parallel digital signal processing channels that are dedicated to machine health prediction processing only; and
    (c2) processing one or more of the plurality of digital vibration signals in one or more of the plurality of parallel digital signal processing channels that are dedicated to machine health protection processing only,
    wherein the one or more parallel digital signal processing channels that are dedicated to machine health prediction processing are separate from and independent of the one or more parallel digital signal processing channels that are dedicated to machine health protection processing;
  (d) generating machine operation output signals based on the machine health protection processing;
  (e) generating machine performance signals based on the machine health prediction processing;
  (f) using the machine operation output signals in the distributed control system to shut down one or more of the machines to avoid damage; and
  (g) using the machine performance signals to observe trends in machine performance or to predict how much longer one or more of the machines can operate before being taken offline for maintenance or replacement.

17. The method of claim 16 wherein the processing steps (c1) and (c2) are performed in separate and independent parallel channels of a field programmable gate array (FPGA).

18. The method of claim 16 wherein the processing step (c1) cannot affect the processing step (c2).

19. The method of claim 16 wherein data associated with the processing step (c1) are stored in first memory locations, and data associated with the processing step (c2) are stored in second memory locations, and the second memory locations can be read during the processing step (c1) but cannot be written to during the processing step (c1).

20. The method of claim 16 wherein the processing step (c1) has a lower priority than the processing step (c2) in a real-time operating system that controls task priority in the distributed control system.

21. The method of claim 16 wherein
  step (f) further comprises providing the machine operation output signals to the distributed control system via an input/output bus, and
  step (g) further comprises providing the machine performance signals to a machine health management data analysis computer via a network communication interface that is independent of the input/output bus.

22. The method of claim 21 further comprising generating control signals in the distributed control system to selectively disable the network communication interface.

* * * * *